Jan. 20, 1942.  H. C. OSBORN, JR  2,270,332
PRESSURE RELIEF VALVE
Filed Feb. 21, 1940
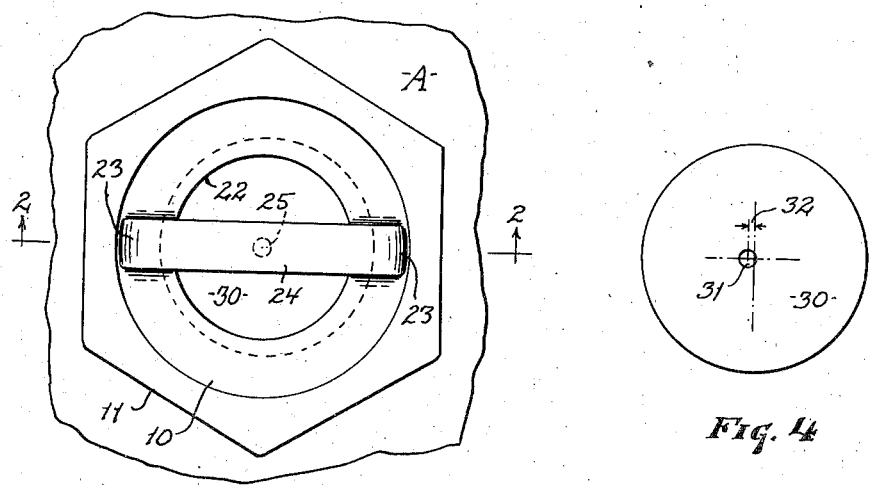
Fig. 1
Fig. 4
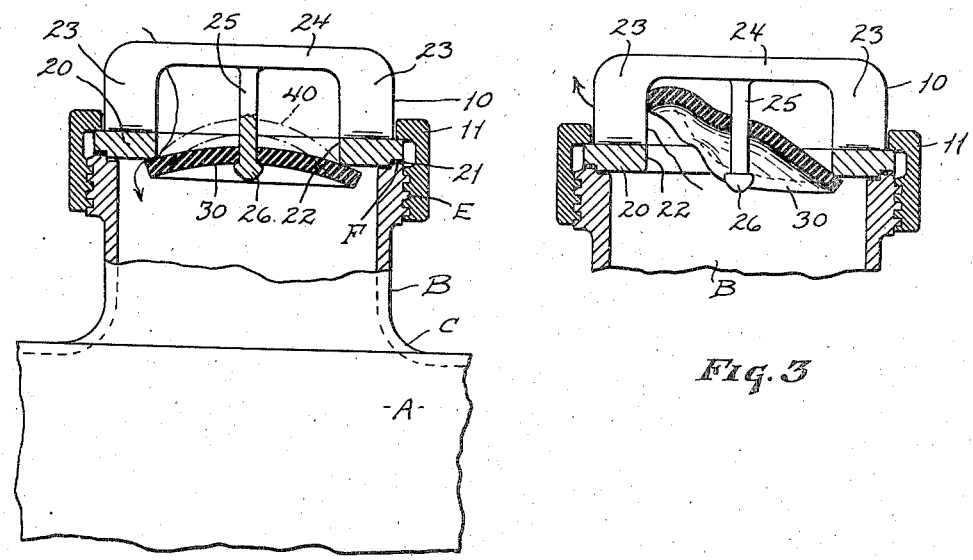
Fig. 2
Fig. 3
INVENTOR.
HENRY C. OSBORN, JR.
BY Bates, Teare, & M<sup>c</sup>Bean
ATTORNEYS Patented Jan. 20, 1942

2,270,332

UNITED STATES PATENT OFFICE 2,270,332

PRESSURE RELIEF VALVE

Henry C. Osborn, Jr., Cleveland Heights, Ohio, assignor to Glascote Products, Inc., Euclid, Ohio, a corporation of Ohio Application February 21, 1940, Serial No. 320,167

12 Claims. (Cl. 137—53)

This invention relates to a pressure relief valve and particularly to a relief valve which will act to relieve both excess and deficient pressures. This, therefore, is the general object of the present invention. A more specific object of this invention is to provide a pressure relief valve which may be maintained in a highly sanitary condition to permit its use on containers such as are used for foodstuffs, as for instance, milk tanks and the like.

Another object of this invention is to provide a pressure relief valve which will comprise a relatively small number of parts, easily separable, one from the other, and individually cleansed.

A further object of the present invention is to provide a pressure relief valve which will act to relieve pressures below or above predetermined limits, and which will be so constructed as to facilitate separation of the parts for replacement or cleansing and permit subsequent reassembly of the parts without changing the responsiveness of the valve to such predetermined minimum and maximum pressures.

A further object of this invention is to provide a pressure relief valve which will relieve both over and under pressure conditions and which valve having relieved one type of pressure condition, will continue to function normally, but which after relieving the other type of pressure condition, will remain in an open or relieving position until reset by an attendant. For instance, a valve which having relieved a low pressure condition ill continue to function normally, but which having opened to relieve a high pressure condition will remain open until manually reset.

Another object of this invention is to provide a pressure relief valve for relieving high and low pressures, and which will be so arranged as to permit the predetermined pressure range to be controlled or adjusted by replacement of a single element but which range cannot be altered without such replacement.

A more specific object of the present invention is to provide a simple and efficient relief valve or vent device which will be compactly constructed, reliable in operation, and economically manufactured.

Other objects and advantages of the present invention will become more apparent from the following description which relates to a preferred embodiment of the invention illustrated in the accompanying drawing. The essential features of the invention will be summarized in the claims.

Referring now to the drawing wherein I illustrate a preferred form of the invention, Fig. 1 is a plan view of my improved pressure relief valve assembly; Fig. 2 is a vertically extending axial section as indicated by the lines 2—2 on Fig. 1; Fig. 3 is a sectional view similar to Fig. 2, but illustrating certain of the parts in a different position, and Fig. 4 is a plan view of the pressure responsive member of my improved valve assembly.

Referring now in detail to the accompanying drawing, it will be seen that my improved pressure relief valve comprises a valve assembly 10, which is adapted to be removably mounted on a vent of a tank or container by any suitable means, as for instance, by a union nut 11. In the drawing, the tank or receptacle is generally indicated at A, and is provided with a tubular vent B, one end of which is welded or otherwise secured to the wall of the container, as at C, and the other end of which may be provided with external threads E to coact with the union nut 11 and facilitate the mounting of the valve assembly on the vent tube. The threaded end of the vent tube B, preferably comprises a finished surface F so as to enable the provision of a seal between the assembly and the tube.

My improved valve assembly 10 comprises a disc 20 which seats against the end of the container vent tube B, and is secured thereto by the union nut 11 as shown in Fig. 2. A sealing gasket 21 is shown as disposed between the end of the vent tube and the disc. As illustrated, the disc 20 is provided with a large central opening or valve port 22, and a pair of upstanding arms 23 which are connected at their tips by a bridge-like formation 24. Secured to or formed integrally with the bridge 24 is a downwardly extending pin or valve stem 25. The valve stem extends axially through opening 22 and is provided with an enlarged head or valve retaining formation 26. To facilitate the cleaning of the assembly, the disc, bridge and stem are preferably formed as a unitary structure.

The valve member comprises a flexible resilient disc 30, preferably formed of a rubber composition or of a substance having generally similar physical characteristics. The valve 30 is slightly larger in diameter than the diameter of the valve port 22, and is provided with a substantially axially positioned opening 31 which is somewhat smaller in diameter than the diameter of the valve stem 25. The valve disc is applied to the valve stem from beneath the disc 20 and shoved into position thereon with the upper surface of the valve bearing against the lower surface of the disc 20 and the lower surface of the valve bearing against a shoulder 27 formed by the formation 26, thus retaining the valve member in a dished or convex condition whereby the resiliency of the valve disc causes it to engage such surface and form a seal between the valve member and disc 20, thus closing the valve port 22.

As indicated in Fig. 2, when the pressure in the tank A falls below a predetermined amount, the flexible valve member 30 is forced downward by the atmospheric pressure external of the tank, thereby opening the valve port and retaining it open until the pressure in the tank is increased to the predetermined minimum. Adjustment of the minimum pressure is accomplished by controlling the resiliency and thickness of the valve member 30 and thus controlling the pressure of the valve member against the disc 20.

When the pressure in the tank A increases above a predetermined maximum it forces the valve member through the valve port 22 in the disc 20, somewhat as indicated in Fig. 3, whereupon the pressure within the tank is brought to atmospheric pressure, and the valve remains in a blown or open position until reset. The frictional engagement between the periphery of the valve member and inner wall of one of the upstanding arms 23 of the valve assembly insures the retention of the valve member 30 in an open position.

The maximum pressure may be adjusted by controlling the resiliency and thickness of the material from which the valve member is made. However, it sometimes happens that the resiliency and thickness of the valve member cannot be readily predetermined to give both the desired minimum and maximum pressure requirements. In such instances, the material is selected to provide the desired minimum pressure requirement, and the maximum pressure requirement is secured by controlling the diameter of the valve disc and offsetting the central opening 31 therein from the true center of the valve member, as indicated by the distance 32 in Fig. 4. When the pressure builds up in the tank, the center of the valve disc rises as indicated by the dotted lines 40 in Fig. 2. The edge of the valve member, therefore, which is closest to the opening 31 has a shorter distance to move than other portions of the valve member before it clears the valve port opening, thus increasing the tendency of that area of the valve member to slide or be blown through the valve port opening as the pressure in the tank increases.

As illustrated, my improved relief valve assembly is arranged to automatically reseat after relieving a deficient tank pressure, and to remain unseated after relieving an excess tank pressure. This particular feature is shown and claimed in my copending application, Serial No. 349,468, filed August 2, 1940. It is obvious that I may reverse these conditions by inverting the assembly relative to the vent opening. However, when the relief valve is constructed to remain open following the relief of an excess tank pressure, as illustrated in the drawing, I so construct the assembly that it cannot be placed on the vent opening in an inverted position. As shown in the drawing and especially in Fig. 2, the bridge 24 is wider than the internal diameter of the vent opening and is of such height that the locking nut 11 cannot engage the vent tube threads when the assembly is inverted. When, however, the reverse condition is desired, the bridge member will be of a width that would permit its entrance into the vent opening and the opposite face of the disc 20 will be provided with ears so spaced as to prevent inversion of the valve assembly.

From the foregoing construction it will be seen that my improved relief valve comprises but two members which may be secured to a tank by a clamping nut, easily removed and separated for cleansing, readily reassembled without disturbing the pressure responsiveness of the valve, and by a substitution of a relatively inexpensive part, the responsive pressure may be changed as desired. While I have described the valve assembly as being secured to a container by the usual union nut, it is obvious that any desired securing means may be used.

I claim:

1. In a pressure relief valve, a disc having a valve port opening therein, a valve stem extending axially through the opening in the disc, means carried by the disc to support the valve stem, a resilient flexible valve member slidably mounted on said stem and engaging one surface on the disc to close the opening therein, means on the stem to retain the valve member thereon and in contact with the disc to thereby close said valve opening, and wherein said valve member is of such size relative to said valve port opening as to permit a portion of said member to be forced through said opening by fluid pressure to open said valve or to permit fluid pressure in the opposite direction to open said valve by moving said member away from said valve port.

2. In a pressure relief valve, a disc having an enlarged central opening, a valve stem coaxial with the opening in the disc, means carried by the disc to support the valve stem, a resilient flexible valve disc slidably mounted on said valve stem and having a diameter greater than the diameter of the opening in said first named disc but of such a diameter relative to the diameter of said opening as to permit a portion of said valve disc to be forced through said opening to open said valve, and means to retain the valve disc on said stem and seated against the first named disc with a predetermined pressure.

3. A pressure relief valve, a disc having an enlarged circular opening therethrough, a valve stem extending coaxial relative to the opening in the disc, said stem being supported by said disc, a resilient flexible valve disc slidably carried by said stem, said valve disc being of a greater diameter than the diameter of the opening in said disc, means on the stem to prevent movement of the valve disc on said stem in a direction away from that side of the disc against which it is normally positioned and to permit sliding movement of said valve disc on the stem in the opposite direction.

4. In a pressure relief valve, a disc having a valve opening extending therethrough, a valve stem axially positioned relative to the opening and extending therethrough, means carried by the disc to support said stem, a shoulder on said stem, a valve member slidably mounted on said stem above said shoulder, and having a flat surface adapted and arranged to engage the bottom surface of the disc and thereby close the valve opening, said shoulder being so positioned as to normally retain said valve member in a convex position, and wherein the resiliency of said member causes it to form a pressure seal with the valve stem and the lower surface of the disc.

5. In a pressure relief valve, a disc having a valve opening, a valve post carried by the disc and extending axially toward the valve opening, a shoulder on said post, a flexible resilient valve disc slidably mounted for axial movement on said post, the shoulder on said post being so spaced from the plane of the bottom surface of the first named disc relative to the thickness of the valve disc as to retain said valve disc in a convex position when seated on the said bottom surface.

6. In a pressure relief valve, a disc having an enlarged valve opening extending therethrough, a valve stem axially positioned relative to the opening and extending therethrough, a bridge secured to and carried by the disc in spaced relation thereto, to support such stem, a shoulder on said stem in the region of the opening in the disc, a resilient and flexible valve disc of a diameter greater than the diameter of the opening in said first named disc, and slidably mounted on said stem above said shoulder, and having a surface adapted and arranged to engage the bottom surface of the first named disc to thereby close the valve opening, the thickness of such valve disc being greater than the distance between the plane of said shoulder and the plane of the bottom surface of said first named disc, whereby said valve disc will be retained in a convex position.

7. In a pressure relief valve, a disc having a central opening, a U-shaped formation secured to said disc in an inverted position, a valve post carried by said U and extending axially into the opening in the disc, an enlarged head on said post forming a shoulder therewith, a flexible resilient valve member provided with a substantially centrally located opening slightly smaller in diameter than the diameter of said post and arranged and adapted to slidably embrace the post, and wherein the shoulder on said post is so spaced from the plane of the bottom surface of the disc as to retain said valve member in a convex position.

8. In a pressure relief valve, a disc having a valve opening, a valve stem extending axially toward the valve opening, means carried by the disc to support the valve stem, a resilient flexible valve disc slidably mounted on said stem and engaging one surface on the first named disc to close the opening therein, and wherein said valve disc is positioned eccentrically relative to said valve opening.

9. In a pressure relief valve, a disc having an enlarged circular valve opening, a valve stem carried by said disc and extending coaxially toward the opening therein, a resilient flexible valve disc slidably mounted on said valve stem and eccentrically thereto, said valve disc having a diameter greater than the diameter of the opening in said first named disc, and means on said stem to seat the valve disc against the first named disc.

10. A pressure relief valve, a disc having an enlarged circular valve port therein, a valve stem extending coaxial relative to the valve port in the disc, said stem being supported by said disc, a resilient flexible valve member slidably carried by said stem, said member being of a greater diameter than the diameter of the valve port, means on the stem to prevent sliding movement of the valve member on said stem in a direction away from that side of the disc against which it is normally positioned and to permit sliding movement of said valve member on said stem in the opposite direction, whereby an excess pressure on said valve member may force said member through said valve port thereby opening said port, and means to retain said valve member in a position to retain said port open.

11. In a pressure relief valve, a disc having a valve port opening therein, a flexible resilient valve member normally engaging one surface of said disc to close said valve port opening, a valve stem carried by said disc and extending through said valve port opening and said valve member to support said member in position to open said port consequent upon either predetermined increased or decreased pressure conditions and to reseat itself following the release of one type of pressure condition and to remain unseated following the relief of the other type of pressure condition.

12. In a pressure relief valve, a disc having a valve port opening therein, a flexible resilient valve member normally engaging one surface of said disc to close said valve port opening, a valve stem carried by said disc and extending through said valve port opening and said valve member to support said member in position to normally close said port and responsive to both a predetermined maximum pressure and a predetermined minimum pressure to open said port to relieve an over or under pressure condition, and wherein said valve member is arranged and adapted to be reseated automatically following the relief of pressure under the predetermined minimum pressure but to remain unseated following the relief of a pressure above the predetermined maximum pressure.

HENRY C. OSBORN, Jr.